United States Patent
Venkatsuresh et al.

(10) Patent No.: US 9,736,684 B2
(45) Date of Patent: Aug. 15, 2017

(54) MECHANISMS FOR DETECTION OF AND RECOVERY FROM CIPHERING PARAMETER MISMATCH ON COMMUNICATION NETWORKS

(75) Inventors: Ajay K. Venkatsuresh, San Diego, CA (US); Suresh Sanka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 13/151,218

(22) Filed: Jun. 1, 2011

(65) Prior Publication Data
US 2012/0308009 A1 Dec. 6, 2012

(51) Int. Cl.
*H04W 12/02* (2009.01)
*H04L 9/08* (2006.01)
(Continued)

(52) U.S. Cl.
CPC ........... *H04W 12/02* (2013.01); *H04L 9/0816* (2013.01); *H04L 63/0457* (2013.01);
(Continued)

(58) Field of Classification Search
CPC ........... H04L 63/0428; H04L 2209/601; H04L 29/06; H04L 9/0618; H04W 80/02
(Continued)

(56) References Cited

U.S. PATENT DOCUMENTS

| 7,388,883 B2 * | 6/2008 | Jiang | 370/470 |
| 7,760,634 B2 * | 7/2010 | Yi | H04B 7/2603 370/231 |

(Continued)

FOREIGN PATENT DOCUMENTS

| CN | 1348286 A | 5/2002 |
| CN | 1380804 A | 11/2002 |

(Continued)

OTHER PUBLICATIONS

International Search Report and Written Opinion—PCT/US2012/040595—ISA/EPO—Sep. 28, 2012.
Taiwan Search Report—TW101119806—TIPO—dated Nov. 17, 2014.

*Primary Examiner* — Tae Kim
*Assistant Examiner* — Shiuh-Huei Ku
(74) *Attorney, Agent, or Firm* — Haojin Wang

(57) ABSTRACT

Disclosed are methods and apparatus for detecting mismatch of ciphering parameters, such as Count-C, in a wireless device and recovery therefrom. The methods and apparatus for detection include examining a predefined ciphered field, such as a Length Indicator field, in one or more received Radio Link Control (RLC) Protocol Data Units (PDUs). Next, a determination of when the field is invalid over a predetermined sample number of PDUs is performed. Mismatch of ciphering parameters can then be determined when a predetermined number of samples of the field detected as invalid exceed a predetermined threshold. Additionally, recovery of PDUs after mismatch detections is disclosed using a range of Hyper-Frame Numbers (HFNs) to decipher buffered PDUs, and then check which of the HFNs eliminate the parameter mismatch by again determining if parameter mismatch occurs using the methods and apparatus for detection.

28 Claims, 8 Drawing Sheets

(51) Int. Cl.
*H04L 29/06* (2006.01)
*H04W 80/02* (2009.01)

(52) U.S. Cl.
CPC ........ *H04L 63/162* (2013.01); *H04L 2209/80* (2013.01); *H04W 80/02* (2013.01)

(58) Field of Classification Search
USPC .................................. 380/255; 713/150, 151
See application file for complete search history.

(56) References Cited

U.S. PATENT DOCUMENTS

| | | | |
|---|---|---|---|
| 7,944,944 B2 * | 5/2011 | Jiang | 370/470 |
| 2003/0091048 A1 * | 5/2003 | Jiang | H04L 1/1877 370/392 |
| 2006/0050679 A1 * | 3/2006 | Jiang | H04L 7/041 370/350 |
| 2008/0123655 A1 | 5/2008 | Kim et al. | |
| 2008/0279218 A1 * | 11/2008 | Jiang | 370/470 |
| 2009/0074046 A1 * | 3/2009 | Huang et al. | 375/227 |
| 2010/0304733 A1 | 12/2010 | Yi et al. | |
| 2011/0028171 A1 * | 2/2011 | Guo | H04L 5/0053 455/502 |

FOREIGN PATENT DOCUMENTS

| | | |
|---|---|---|
| CN | 101053184 A | 10/2007 |
| CN | 101420424 A | 4/2009 |
| EP | 1195923 A2 | 4/2002 |
| EP | 1635510 A2 | 3/2006 |
| EP | 1928130 A2 | 6/2008 |
| JP | 2006087097 A | 3/2006 |
| JP | 2006217100 A | 8/2006 |
| JP | 2007533280 A | 11/2007 |

* cited by examiner

MECHANISMS FOR DETECTION OF AND RECOVERY FROM CIPHERING PARAMETER MISMATCH ON COMMUNICATION NETWORKS

BACKGROUND

Field

The present disclosure relates generally to detection of and recovery from ciphering parameter mismatch, and more specifically to methods and apparatus for detecting a ciphering parameter mismatch in the Radio Link Control (RLC) layer using a ciphered field in Protocol Data Units (PDUs) and for recovery of PDUs after mismatch is detected.

Background

In 3rd and 4th generation (i.e., 3G and 4G) wireless technologies, certain technologies or systems are utilized such as Wideband Code Division Multiple Access (WCDMA) also known as Universal Mobile Telecommunications System (UMTS). These terms may be used interchangeably and reference the same underlying technology. FIG. 1 illustrates an example of a WCDMA/UMTS communication system. As illustrated, a communication system 100 includes a base station (BS) also known as NodeB 102 that transmits signals 104 on a downlink (DL) or forward link (FL) channels to mobile devices or User Equipment (UE) 106. The UEs 106, in turn, may transmit signals 108 to BS 102 via uplink (UL) or reverse link (RL) channels. It is noted that for UMTS systems that the base stations or NodeBs (e.g., 102) and other devices effecting a network such as Radio Network Controllers (e.g., RNC 110), may be also collectively referred to as a Universal Terrestrial Radio Access Network or UTRAN.

In order to protect user data and signaling information between UEs and NodeBs from being intercepted by unauthorized devices, communications systems such as WCDMA/UMTS utilize Ciphering to encrypt the transmitted data and signaling information. The WCDMA/UMTS protocol stack is broadly classified in to the Access-Stratum and the Non-Access-Stratum. Ciphering is performed at specific layers in the "Access stratum" of the UMTS protocol stack. As an illustration of this protocol, FIG. 2 provides an example of the Access Stratum employed in devices such as UE 106 or BS 102. The Access Stratum includes three layers: layer 1, layer 2 and layer 3, which together provide transport for a signaling plane (C-plane) 202 and a user plane (U-plane) 204. The C-plane 202 handles transport for signaling data between UEs and NodeBs, whereas U-plane 204 handles user data transport between UEs and the NodeBs.

Layer 1 includes the physical (PHY) layer 206, which is responsible for procedures related to transmission and reception of WCDMA/UMTS signals over the air. These include signaling messages, transfer of data and other related procedures. Layer 2 includes a Medium Access Control (MAC) layer 208, a Radio Link Control (RLC) layer or entity 210, and a packet data convergence protocol (PDCP) layer 212 used for the user plane (U-plane) 204. Layer 3 of the Access stratum includes a Radio Resource Control (RRC) layer 214. The RRC 214 sets up and configures all radio bearers (RBs), and the PDCP layer 212 provides header compression for Service Data Units (SDUs) received from the U-plane 204 or decompression for Protocol Data Units (PDUs) sent to the U-plane 204. RLC layer 210 provides segmentation of SDUs from either RRC 214 or PDCP layer 212 into RLC protocol data units (PDUs). MAC layer 208 provides scheduling and multiplexing of RLC PDUs onto the transport channel, and interfacing with PHY layer 206.

As mentioned before, Ciphering is performed at particular layers in the Access stratum protocol. Specifically, Ciphering is performed at either the RLC layer 210 or the MAC layer 208 in Layer 2, the choice of which is dependent on one of three particular modes of operation of an RLC protocol. For RLC Transparent Mode (TM) operation mode, Ciphering is performed at the MAC level (e.g., MAC-d entity), whereas in RLC Unacknowledged Mode (UM) and RLC Acknowledged Mode (AM) of operations, Ciphering is performed at the RLC level. Ciphering is utilized, in particular, for protecting data transmitted over-the-air, whether performed at the RLC or MAC levels.

Ciphering/Deciphering Algorithms or engines used for performing Ciphering/Deciphering utilize a time-varying parameter value or count referred to as Count-C, which is based on a combination of a Hyper-Frame Number (HFN) and a sequence number (SN) of a particular RLC PDU in UM RLC and AM RLC modes or an HFN value and Connection Frame Number (CFN) for RLC TM where Ciphering is performed at the MAC layer. In UMTS/WCDMA, as examples, the Count-C value is a 32-bit value. As an illustration, FIG. 3 illustrates that for an RLC TM mode 302, the Count-C value is derived from a MAC-d HFN comprised of 24 bits and a CFN values of 8 bits. For an RLC UM mode 304, the Count-C value is derived from a 25 bit HFN and 7 bit SN in the header of an RLC PDU, and in an RLC AM mode, the Count-C value is derived from a 20-bit HFN and 12 bit SN in the header of an RLC PDU. In particular, the SN is embedded in a header of a packet, while HFN is a count maintained in both a transmitter and a receiver (e.g., a transmitter of an eNodeB and a receiver in a UE). Each time an SN wraps around its maximum representing value back to zero, the HFN is incremented by one in both the transmitter and in the receiver. For example, if SN is represented by 7 bits as in RLC UM, which counts from zero to 127, once the SN value is beyond 127, the HFN is incremented by one, and the SN restarts from zero. As a result, according to the SN, the transmitter and the receiver can timely increment the HFN to keep synchronization of the HFN and maintain the ciphering and deciphering processes. It is noted that the illustration of FIG. 3 is a representation of how a Count-C value is determined, not an illustration of a structure, such as a packet structure.

Under certain circumstances, however, the HFN and attendant Count-C values between the transmitter and the receiver may be out of synchronization, causing both the transmitter and receiver to fail in the ciphering and deciphering processes. When this parameter mismatch occurs, the receiver would discard all incoming data, and in rare instances, might even reconstruct corrupted frames and pass these over to the higher layers. This scenario may happen with both RLC UM and RLC AM modes of operation, and has substantial and deleterious effects on the end-user experience. This problem of parameter mismatch has a particularly high probability of occurrence with RLC UM mode of operation where the sequence number space is very small. For instance, in devices capable of high data rates, such as in Evolved High-Speed Packet Access (HSPA+) capable receivers, an SN rollover may occur as frequently as every 4-6 ms under certain network configurations.

A ciphering parameter mismatch between the transmitter and receiver might result in the RLC Reset procedure as defined in 3GPP TS 25.322 (RLC), for the RLC Acknowledged Mode (AM) of operation. The 3GPP specifications provide for a mechanism wherein the transmitter and receiver may recover from the mismatched state, following an RLC Reset procedure. This reset, however, is applicable only for RLC AM mode of operation, and also involves a significant amount of data loss (i.e., a lossy solution, meaning it involves loss of data), and recovery with a very high latency that still has a substantial impact on the end-user experience. For RLC UM operation, the 3GPP specification does not define an equivalent of the RLC Reset usable in RLC AM mode. Thus, if the Count-C values go out of synchronization between transmitter and receiver, this would result in all incoming data being discarded by the receiver as there is no known recovery mechanism for RLC UM mode of operation.

Another known mechanism is known as a Counter Check procedure, wherein the network (e.g., RNC 110) can trigger this procedure to validate Count-C values used by UEs. If a mismatch is found, the network could then release the RRC Connection. This mechanism, however, would still result in a significant amount of data loss, as well as RRC Connection release, which would significantly affect the end-user experience due to such data loss and delays caused by call reestablishment after release. Thus, even if the UE detects a problem, this mechanism still cannot be employed for recovery.

Accordingly, there is a need for mechanisms for detection and recovery from such conditions as parameter mismatch, including lossless recovery where no data is lost.

SUMMARY

According to an aspect, a method for determining mismatch of ciphering parameters in a wireless device is disclosed. The method features first examining a predefined ciphered field in one or more received Radio Link Control (RLC) Protocol Data Units (PDUs). Next, the method includes determining when the predefined ciphering field is invalid over a predetermined sample number of PDUs. A parameter mismatch of ciphering parameters is determined when a predetermined number of samples of the field that are determined as invalid exceed a predetermined threshold.

According to another aspect, an apparatus for determining mismatch of ciphering parameters in a wireless device is disclosed. The apparatus includes means for examining a predefined ciphered field in one or more received Radio Link Control (RLC) Protocol Data Units (PDUs). The apparatus further includes means for determining when the predefined ciphered field is invalid over a predetermined sample number of PDUs. Additionally, the apparatus includes means for determining a parameter mismatch of ciphering parameters when a predetermined number or percentage of samples of the predefined ciphered field that are determined as invalid exceed a predetermined threshold.

In yet another aspect, an apparatus for determining mismatch of ciphering parameters in a wireless device is disclosed. The apparatus includes at least one processor configured to examine a predefined ciphered field in one or more received Radio Link Control (RLC) Protocol Data Units (PDUs). The at least one processor is further configured to determine when the predefined ciphered field is invalid over a predetermined sample number of PDUs, and then determine a parameter mismatch of ciphering parameters when a predetermined number or percentage of samples of the predefined ciphered field that are determined as invalid exceed a predetermined threshold.

In still one more aspect, a computer program product comprising computer-readable medium is disclosed. The medium includes code for causing a computer to examining a predefined ciphered field in one or more received Radio Link Control (RLC) Protocol Data Units (PDUs) in order to determine mismatch of ciphering parameters in a communication device. The medium further includes code for causing a computer to determine when the predefined ciphered field is invalid over a predetermined sample number of PDUs, and code for causing a computer to determine a parameter mismatch of ciphering parameters when a predetermined number of samples of the predefined ciphered field that are determined as invalid exceed a predetermined threshold.

DETAILED DESCRIPTION

The presently disclosed methods and apparatus provide detection and recovery from conditions such as parameter mismatch (e.g., Count-C mismatch). Furthermore, the present methods and apparatus provide lossless recovery in which data is not lost due to a parameter mismatch condition. In a particular aspect, the present apparatus and methods utilize a feature of AM and UM modes of RLC operation. RLC PDUs include header information including sequence numbers of known lengths, and some optional variable fields, that may point to specific locations within the PDU. While the sequence numbers are not ciphered, the optional field portions of the header are ciphered. Accordingly, since these optional field portions are ciphered, it follows that if a receiver uses an incorrect Count-C parameter (i.e., a mismatched parameter), the data in these optional field portions in a PDU will, with high probability, point to invalid positions that might lie beyond the end of the PDU. Thus, detection of invalid positions denoted by the optional field portions may be used to quickly and efficiently determine that Count-C values between the transmitter and receiver are out of synchronization (i.e., mismatched).

Furthermore, since the present methods and apparatus effect a quick determination of parameter mismatch, recovery of incorrectly deciphered PDUs may then be more quickly initiated. Additionally, PDUs received and buffered during parameter mismatch may be recovered after detection of the incorrect Count-C with little or no loss of data.

Figure 4:
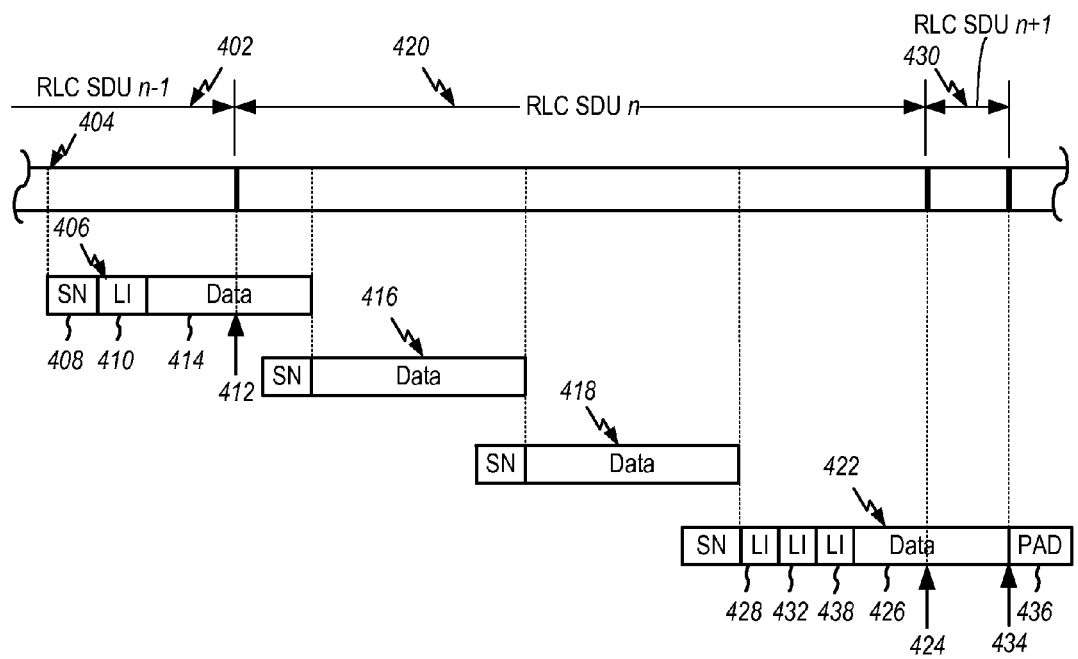
FIG. 4 illustrates one example of the structure of RLC PDUs wherein one or more of the PDUs contain one or more optional field portions in the header that may be used by the present apparatus and methods for parameter mismatch detection.

FIG. 4 illustrates one example of the structure of PDUs having a number of SDUs packed therein, wherein one or more of the PDUs contain one or more optional field portions in the header that may be used by the present apparatus and methods for parameter mismatch detection. In particular, an example of optional field portions used in PDUs for UM and AM modes that may be utilized are one or more Length Indicator (LI) fields. The LI fields can be visualized as pointers to a particular position or byte-offset in the PDU that denotes the end of the RLC SDU, and also may be packed or arranged sequentially in the order of the SDUs to which they refer. FIG. 4 provides one illustration of these relationships.

In particular, FIG. 4 illustrates how a transmitter at the RLC level may pack data from input SDUs into a number of output PDUs in a given transmission time interval (TTI) comprising the time of a number of PDUs; in this case four PDUs (406, 416, 418, and 422). As illustrated remaining bytes of data from an RLC SDU 402 numbered n−1 are transmitted the start 404 of the particular illustrated TTI in a first PDU 406. As illustrated, PDU 406 includes header information including the SN 408 and at least one LI 410. The LI 410 may be used to point to the end 412 of SDU 402 within data field 412. In this example, a next two PDUs 416 and 418 do not include LI fields, but merely data and sequence numbers (SNs) as the data therein is fully used for a next $n^{th}$ RLC SDU 420 and the end of SDU 420 does not fall within the occurrence of PDUs 416 and 418.

Data from SDU 420 is finally exhausted during a fourth PDU 422 during the TTI as illustrated by point 424 in data field 426. Accordingly, PDU 422 includes within header information at least one LI 428 that may point to the end of SDU 420 at point 424. For illustration purposes, the example of FIG. 4 shows that data from a complete third RLC SDU n+1 (430) may be packed into the fourth PDU 422, the PDU being large enough to contain all the data. Accordingly, PDU 422 is shown with a second LI field 432 that points to the end of SDU 430 at point 434 in PDU 422. Moreover, since the third PDU is shown not to fill the remainder of data field of PDU 422, this PDU includes padding 436 that fills remaining space in PDU 422. Accordingly, a third LI 438 is illustrated in PDU 422 that would indicate to a receiver that the remaining data is padding 436.

It is noted that the size of the LI field is known by both the transmitting and receiving entities. In the 3GPP specification, this length may be either 7 or 15 bits, although the particular size is not as relevant to the present methods and apparatus, as the fact that an extant optional field in the header that is ciphered and deciphered may be exploited for determining ciphering parameter mismatch. In the example of an LI, any LI value that points to a value exceeding the length of the PDU in which it is included is considered invalid. A receiver using an incorrect or mismatched Count-C value is very likely one cause of an invalid LI. Thus, determining invalid LIs may be used for making a determination of or inferring a Count-C mismatch. It is noted here that merely because the present methods and apparatus are disclosed within the context of using LIs, this is not meant to preclude the possibility that any other conceivable non-data portions of a PDU that are subject to ciphering and have known values or ranges thereof could be utilized to infer a Count-C mismatch.

Figure 5:
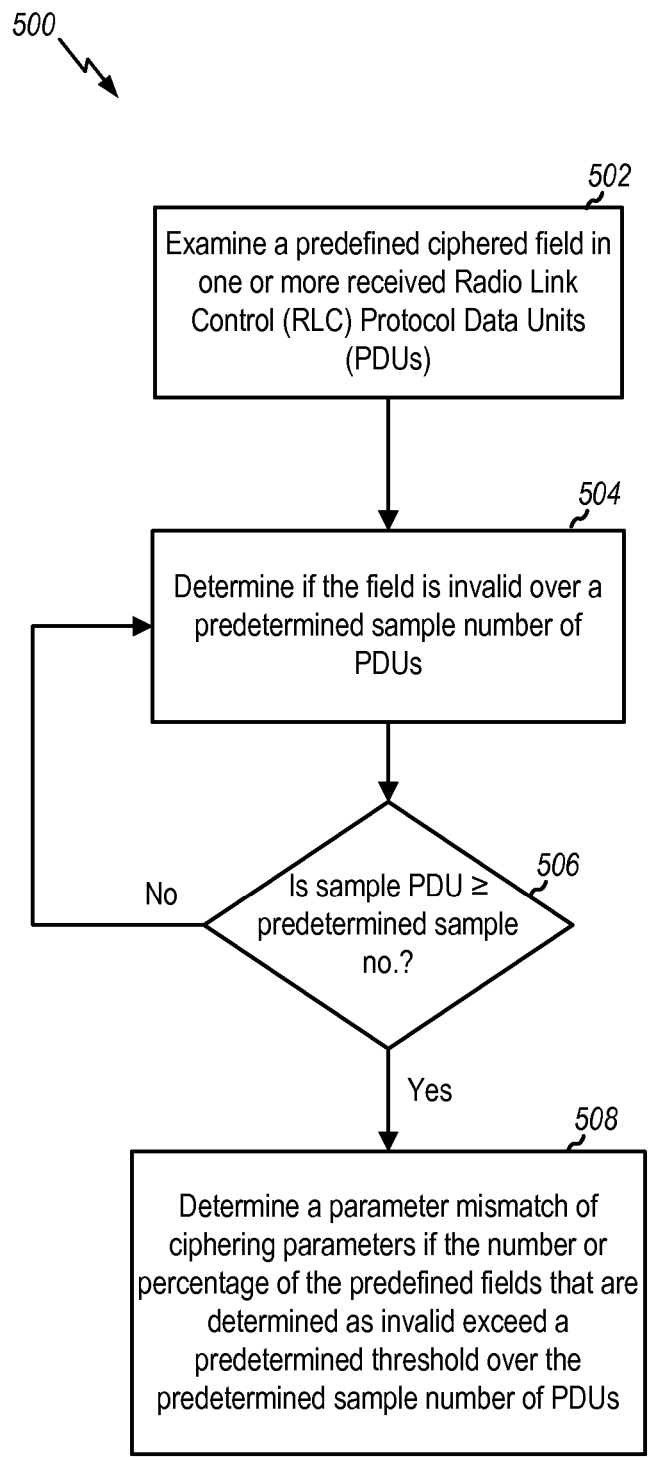
FIG. 5 illustrates a flow diagram of a method for detecting ciphering parameter mismatch in a wireless communication system.

In light of the above considerations, detection of ciphering parameter (e.g., Count-C) mismatch between transmitter and receiver may be performed by determining if a number of PDUs with LIs have wrong or invalid LIs in some sample set of PDUs. To this end, FIG. 5 illustrates a method for detecting ciphering parameter mismatch in a wireless communication system. Method 500 may be utilized in either a mobile device such as a UE, or a base station (NodeB), or even in other network entities such as an RNC. Furthermore, method 500 is effected at the RLC level, and for modes of operation such as RLC UM mode and RLC AM mode.

As illustrated, method 500 includes examining a predefined ciphered field in one or more received Radio Link Control (RLC) Protocol Data Units (PDUs) as shown in block 502. This process may include examining or sampling each received PDU in a receiver, for example, and looking or detecting to see whether one or more of the predetermined ciphered fields are present therein. In light of the prior discussion, in an aspect the ciphered field is an LI field, although as also discussed before, it is contemplated that other optional non-data fields of known value in a PDU could also be utilized or created for the purpose of detecting parameter mismatch.

When PDUs having the predefined ciphered field are found by the process of block 502, method 500 then includes determining when the field is invalid as shown in block 504. In particular, a determination may be made whether the field is invalid over a predetermined sample number of PDUs. In a particular aspect, process 504 may include determining whether the field is invalid over the predetermined sample number of PDUs detected having the predefined ciphered field (e.g., an LI field or other field that is ciphered). Thus, in this example, if the predetermined number of samples was set to three (3), a total number of PDUs examined would likely be greater than three as some of the PDUs do not contain the field and could also span across multiple SDUs packed into the PDUs. This may be seen in FIG. 4, for example, where not all PDUs will include the LI field. Additionally, the process in block 504 may operate concomitantly with the operation of block 502, wherein each received PDU is examined first for the presence of the predefined field, and then whether that field is invalid. Furthermore, a count of the number of PDUs with invalid fields is maintained by the process block 504, or alternatively the number of invalid fields themselves (such as in the case of multiple fields in a single PDU) is tallied.

The processes of block 504 may continue until the predetermined sample number of PDUs (or PDUs including the predefined field) has been reached as illustrated by decision block 506. It is noted that if the predetermined sample number is not yet reached, the illustrated loop back to block 504 merely shows that the examination and determination of field validity for the received PDUs continues for each received PDU up until the predetermined sample number has been reached.

Figure 3:
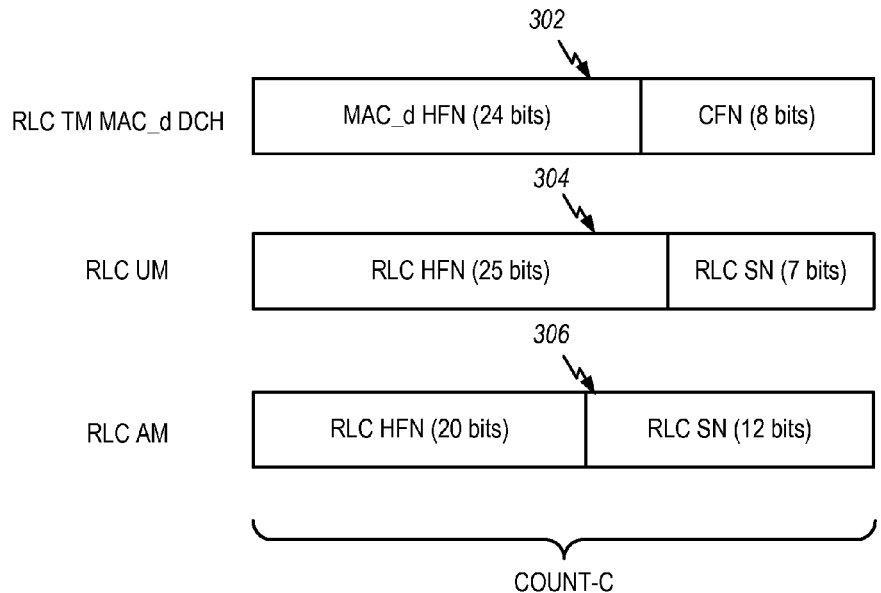
FIG. 3 illustrates a Count-C value derivation for various RLC modes.

After the predetermined number of sampled PDUs (or PDUs with the predefined field) has been reached, flow proceeds to block 508 wherein a determination of a parameter mismatch of ciphering parameters is made. In particular, parameter mismatch is determined or detected if the number of the predefined ciphered fields or a percentage of the predefined ciphered fields determined as invalid exceeds a predetermined threshold (whether the threshold represents a number or a percentage) over the predetermined sample number of PDUs. In another aspect, determination of parameter mismatch may be based upon whether the ratio of a count of invalid predefined fields to the total number of PDUs including the predefined field exceeds a predetermined threshold. It is noted here that the particular parameter that may be determined as mismatched is the ciphering parameter Count-C as illustrated in FIG. 3.

As will be explained in further detail later in connection with other illustrated aspects of the present methodology, when a current PDU is determined as having an invalid field, such as an invalid LI field, the current PDU is affirmatively buffered, along with previous PDUs carrying the current SDU for the purpose of recovering these buffered PDUs and SDU(s).

Figure 6:
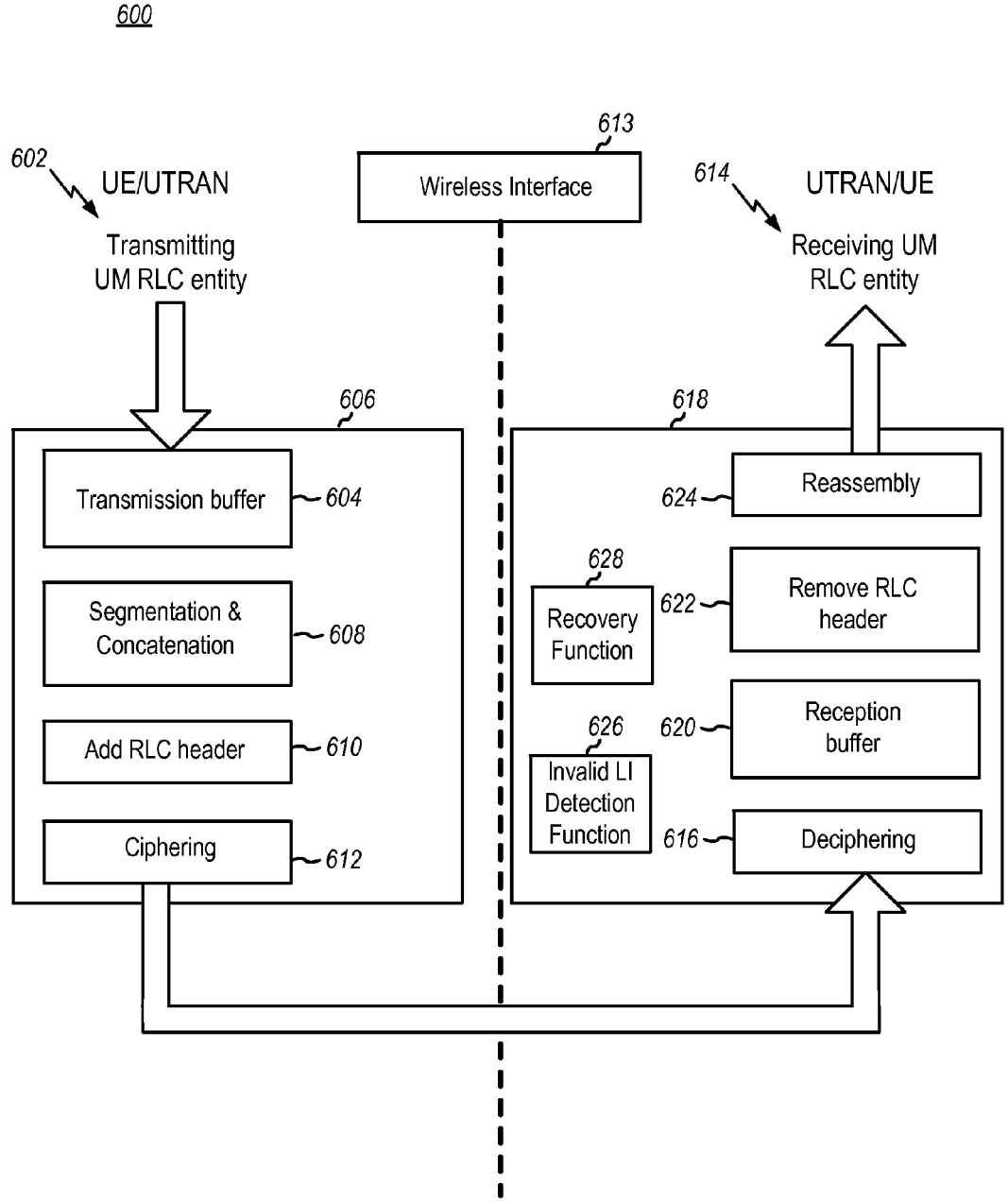
FIG. 6 illustrates a block diagram of exemplary apparatus for use in a wireless communication system that may employ the presently disclosed ciphering parameter detection and PDU recovery.

FIG. 6 illustrates a block diagram of exemplary apparatus or system 600 that may employ the presently disclosed methods for ciphering parameter detection and PDU recovery. In particular, FIG. 6 does not show a particular structure of a UE or network or UTRAN apparatus, but rather a high level block diagram of functional blocks, logic, or circuitry and their interrelationship and the flow of data. As illustrated, apparatus 600 may include a transmitting entity 602, that may comprise a UE or a UTRAN entity. In the particular example of FIG. 6, RLC UM mode transmitting and receiving entities are illustrated as merely exemplary. One skilled in the art will appreciate that the concepts and methodologies herein apply to somewhat more complex RLC AM mode entities (not illustrated herein), as well as other contemplated RLC modes that might utilize ciphering and ciphered fields in RLC PDUs.

Figure 1:
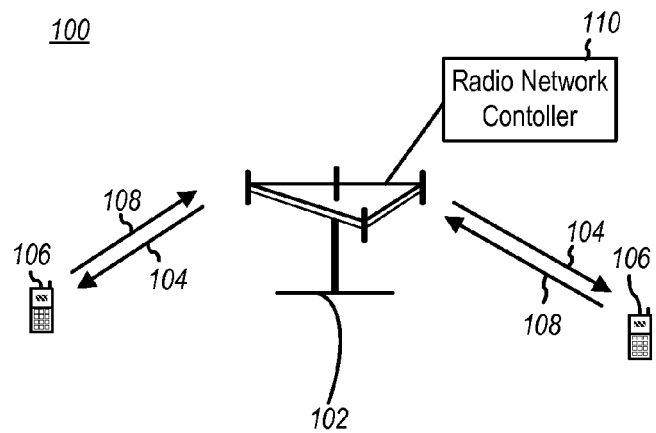
FIG. 1 illustrates an example of a communication system, which may employ WCDMA or UMTS.
Figure 2:
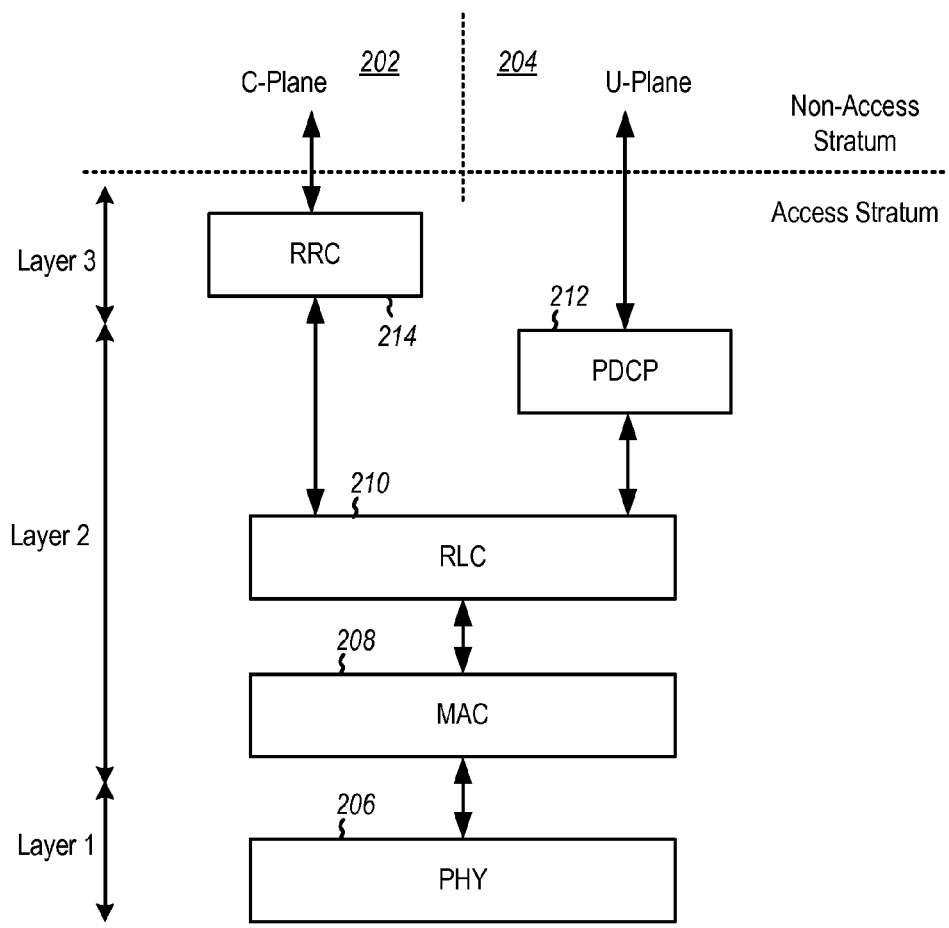
FIG. 2 illustrates an example of the Access Stratum employed in a communication such as the system illustrated in FIG. 1.

The transmitting entity 602 includes processing or circuitry, as well as the RRC (not shown) that generate data (e.g., SDUs) to be delivered to the RLC layers of the entity 602. This is illustrated by the arrow input to a transmission buffer 604 and block 606 may be considered the RLC layer, similar to block 210 in Layer 2 of FIG. 2. The buffered data in buffer 604 is then segmented and concatenated for arrangement into PDUs as represented by block 608. The PDUs also are arranged to include header data as represented by block 610. The header information includes the sequence number (SN) as well as the optional fields such as LI fields.

After arrangement of the PDUs for transmission by blocks 608 and 610, the data is ciphered by block 612 sing any number of ciphering techniques known in the art. It is noted that typically the SN fields in the headers are not ciphered, whereas the LI fields are, as well as the data in the PDUs. After arrangement, the PDUs are then passed to other Layer 2 layers such as the MAC layer and the PHY layer in Layer 1 (not shown in FIG. 6) for transmission over the wireless interface 613.

A receiver entity 614 then receives the transmitted data over the wireless interface 613. Receiver entity 614 may comprise a UE or a network or UTRAN device or apparatus. After data passes through the PHY and MAC layers, the received MAC PDUs are then translated to the RLC layer PDUs and deciphered as indicated by block 616 in the RLC layer 618. It is here, however, where parameter (i.e., Count-C) mismatch between transmitting entity 602 and receiver entity 614 may cause deciphering failures. Additionally, it is in block 618 where the present methodology, such as methods 500 or 700, may be employed to quickly detect mismatch.

After deciphering, is performed, the data is buffered by reception buffer 620 and the RLC PDU header information removed at block 622 for decoding (the decoding apparatus/functionality not shown in FIG. 6), and rearrangement or reassembly (624) of the PDUs back into SDUs for use by the RRC and upper layers. It is noted that the buffer 620 in block may be used with the presently disclosed methods for detection and recovery, or alternatively a dedicated buffer (not shown) may be used for recovery in addition to buffer 620.

FIG. 6 also illustrates that a receiver may include additional functionalities 626 and 628. Function 626 is an invalid LI detection function that effects functionality to determine invalid LIs in conjunction with other modules or functions of the receiver, such as the deciphering 616. The function 626 may be used to effect processes of method 500, or method 700 to be described later. Function 628 is a recovery function that works in conjunction with other modules, such as deciphering 616 and buffer 620 (or another dedicated buffer not shown), to effect recovery of PDUs occurring during parameter mismatch, such as will be detailed later in connection with method 800 of FIG. 8. Functionalities 626 and 628 may be embodied with hardware, software, logic, other circuitry, or combinations thereof.

Figure 7:
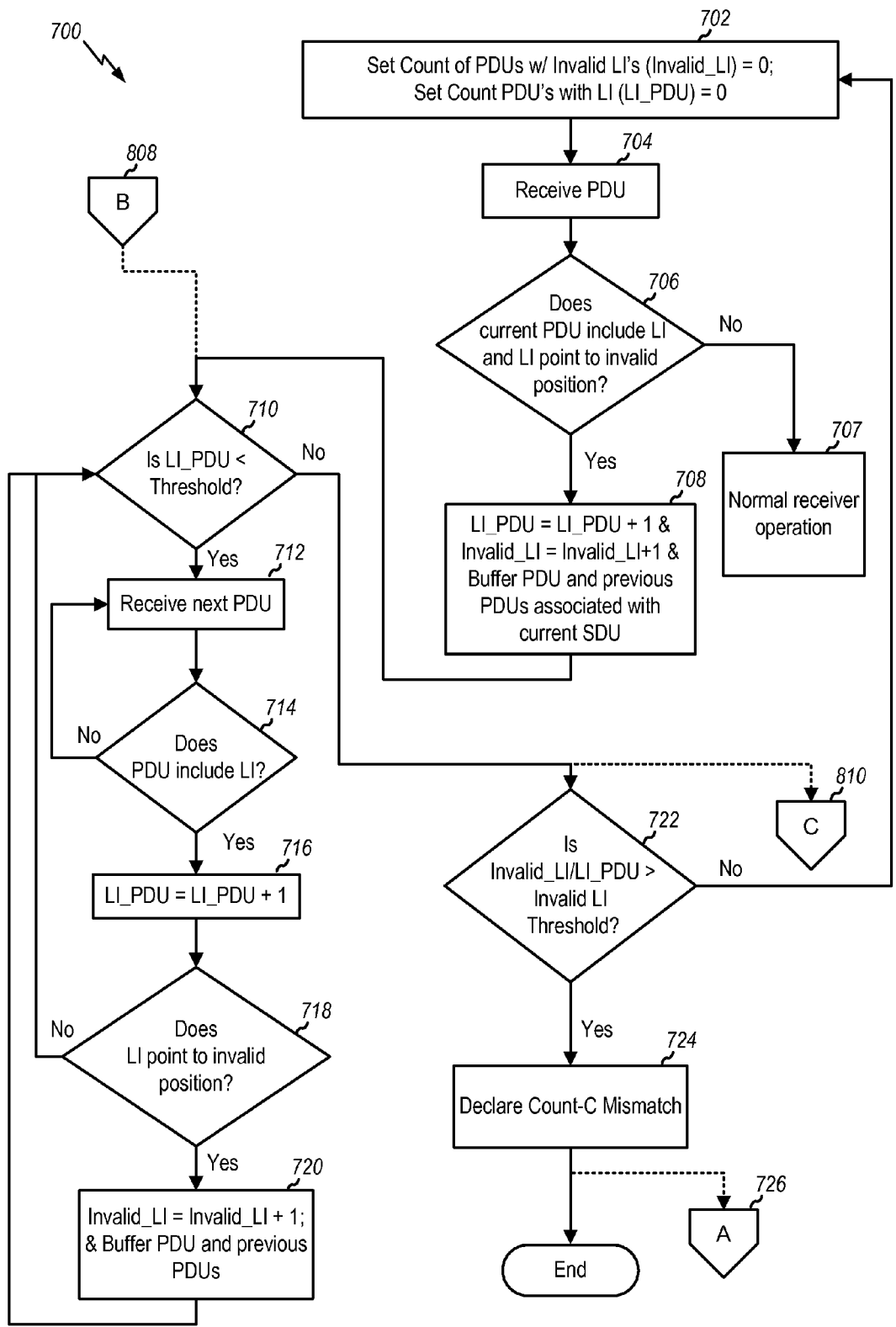
FIG. 7 illustrates a flow diagram of another exemplary method for detecting ciphering mismatch in a wireless communication system.

FIG. 7 illustrates another method 700 for detection of Count-C mismatch by examining LI fields in RLC PDUs according to an aspect. It is noted that method 700 is a more specific implementation of the methodology illustrated in FIG. 5. As illustrated, particular counter values are initialized in block 702. A count of PDUs having LIs present, termed LI_PDU, is set to zero. In addition, a count of examined PDUs having invalid LI fields, termed Invalid_LI, is also set to zero.

After initialization in block 702, a PDU is received as illustrated in block 704. The received PDU is then examined to determine whether this current PDU includes an LI field, and if the LI field is invalid; i.e., points to an invalid position as shown in decision block 706. If not, flow proceeds to block 707 wherein normal receiver operations resume. It is noted that after resumption of normal operation block 707, the processes of method 700 may resume for a next PDU or SDU in order to again monitor or detect mismatch of ciphering parameters in subsequent PDUs or SDUs.

If a current PDU is determined to include an LI that is also invalid in block 706, flow proceeds to block 708 where the count of PDUs having LIs (LI_PDU) and the count of PDUs with invalid LIs (Invalid_LI) are each incremented by a value of one. Additionally, for purposes of recovery the PDU may be specifically buffered along with previous PDUs associated with at least a current SDU.

After block 708, flow proceeds to decision block 710 where a determination is made whether the current count of LI_PDU is less than a predetermined threshold. This threshold may be determined based on a desired number of PDUs having LIs to be sampled. Additionally, in the case of buffering PDUs for recovery purposes, the predetermined threshold for LI_PDU, in essence, establishes the size of the buffer. Thus, the predetermined threshold may be set accounting for the desired or available memory for buffering. If the threshold has been reached, thereby indicating a requisite number of sampled LI_PDUs have been sampled, flow proceeds to block 722, which will be discussed later. On the other hand, if the threshold has not yet been reached, as determined in block 710, flow proceeds to block 712 where a next PDU is received.

After a next PDU is received in block 712, a determination is made whether this next PDU includes an LI field as shown by decision block 714. If not, flow loops back to block 712 to wait for the next PDU. If, however, the PDU is determined as having an LI field in block 714, flow proceeds to block 716 wherein the number of sampled PDUs having at least one LI field (i.e., the LI_PDU count) is incremented by one. Next, a determination is made whether the at least one LI field points to an invalid position at decision block 718. If not, flow then proceeds back to block 710 to determine whether the threshold LI_PDU value has been reached.

If, on the other hand, the next PDU includes an invalid LI field as determined in block 718, flow proceeds to block 720 where the count of PDUs having an invalid LI field (i.e., Invalid_LI) is incremented by one. Additionally, the processes of block 720 may include affirmatively buffering the present, next PDU as well all previous PDUs associated with an SDU that is packed into the present PDU. Flow then proceeds back to decision block 710 to again check whether the requisite predetermined threshold number of PDUs with LIs has been sampled.

When the threshold in block 710 has been reached, flow proceeds to decision block 722 to determine whether a ciphering parameter mismatch is likely. In an aspect, block 722 may be determined based on a ratio of the number of PDUs determined to have invalid LIs to the number of total PDUs with LIs sampled (i.e., Invalid_LI/LI_PDU). If this ratio then exceeds a predefined threshold, a parameter mismatch (e.g., Count-C mismatch) may be determined as shown in block 724. By using this ratio or percentage of PDUs having invalid LIs, the predefined threshold may be set to ensure with a desired level of probability that Count-C mismatch more likely exists. The predefined threshold may therefore be set as desired or based on empirical data. In an alternative, rather than determine the ratio in block 722 and keep a count of total PDUs with LIs, it is contemplated that only the Invalid_LI count could be maintained over a number of sampled PDUs or a set time period, and a Count-C mismatch declared when the Invalid_LI count exceeds a threshold.

If the requisite predefined threshold is not exceeded in block 722, flow would revert back to initialization block 702 to start the process 700 over again for subsequent received PDUs. In an alternative including recovery of PDUs received during parameter mismatch, flow would proceed from block 724 to a recovery process indicated by a call to block A (726). The recovery process is discussed as follows in connection with FIG. 8, as well as FIG. 7.

Figure 8:
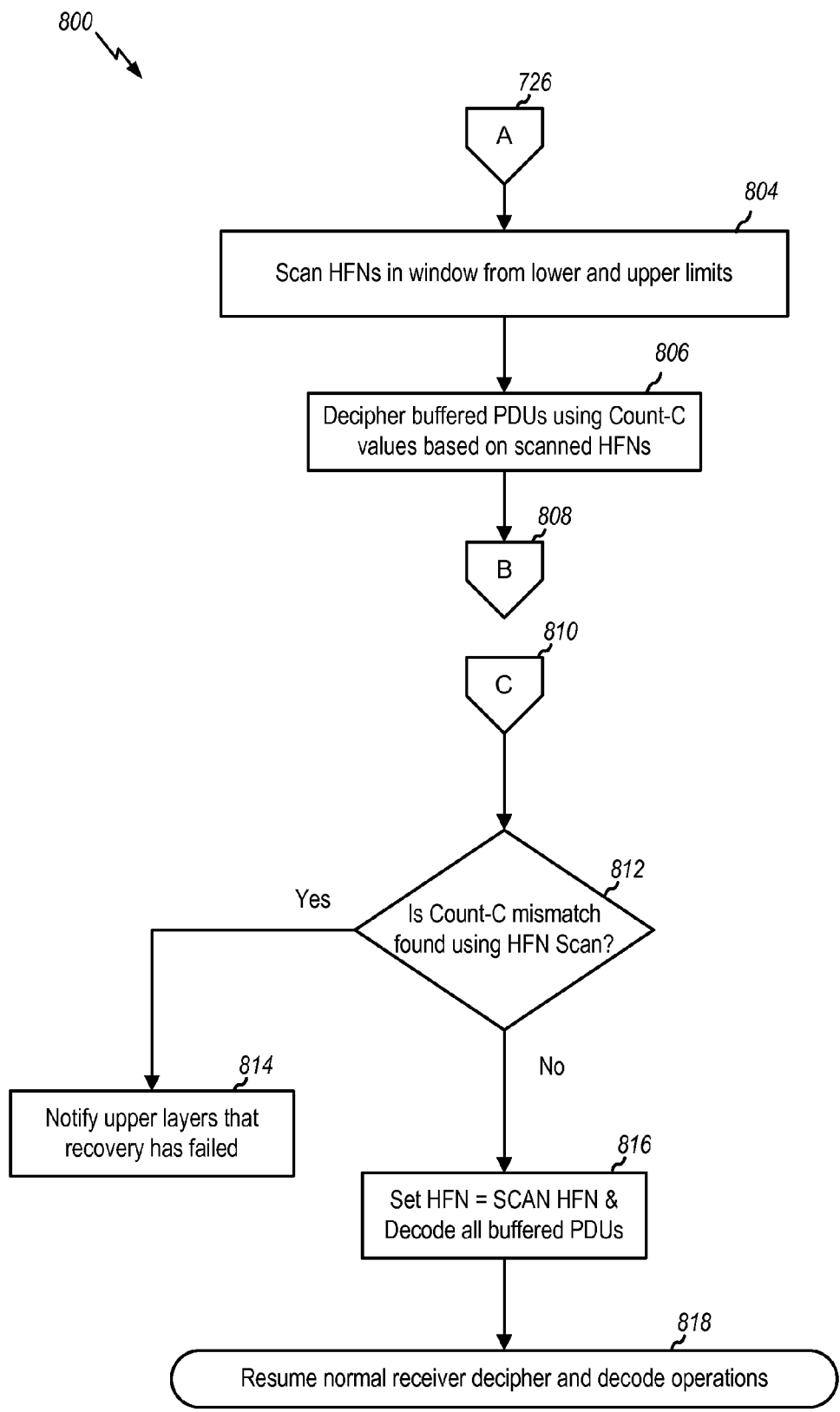
FIG. 8 illustrates a flow diagram of an exemplary method for recovering PDUs after a ciphering mismatch is detected in a wireless communication system.

As shown in FIG. 8, a recovery method 800 is called at block A (726) after determination of a Count-C mismatch in block 724 of FIG. 7. As explained previously in connection with FIG. 3, Count-C is comprised of the Hyper-Frame number (HFN) and the RLC Sequence number (RLC SN). The RLC SN is not ciphered and, thus, can be determined accurately by a receiver even in case of a Count-C mismatch. Accordingly, it follows that the only portion of the Count-C value that can contribute to the parameter mismatch is the HFN. The mismatch may occur if either the transmitter increments the HFN while the receiver does not, or the receiver increments the HFN while the transmitter does not.

Accordingly, if a Count-C mismatch has been detected by a receiver based on the method 700, then the receiver may be effect recovery based on examination of the HFN component of the Count-C values in a window around a current HFN over all or a portion of the PDUs buffered in method 700. As illustrated in FIG. 8, block 804 includes scanning HFNs in a window having lower and upper limits. In particular, the process 804 may include scanning HFNs in the window (e.g., [CURRENT_HFN-SCAN_WINDOW_LEFT] to [CURRENT_HFN+SCAN_WINDOW_RIGHT]). Based on this scan, method 800 then includes attempting to decipher the buffered PDUs from the detection method 700, using the resultant Count-C values corresponding to each HFN in the scanned window as illustrated in block 806.

Flow then proceeds to call B (808), which calls method 700 allowing a receiver implementing the method to re-run at least a portion of the detection method 700 using the results from the PDUs deciphered based on the scanned HFNs. Accordingly, as shown in FIG. 7, the PDUs would sequentially be run through the detection method 700 starting with block 710. It is noted that, although not shown, the count values Invalid_LI and LI_PDU would be started at zero, and the process of buffering the PDUs in block 720 would not need to be performed. Additionally, the processes of block 710 through 720 would be performed over the number of deciphered PDUs from method 800 (or alternatively a subset of this number), which may be a number of PDUs greater than the value LIPDU threshold predetermined for method 700. In another aspect, the process of running the processes of blocks 710 through 720 could be optimized by limiting the process of block 806 to deciphering only those PDUs that had an LI present, which would total the threshold LI_PDU in method 700. Accordingly, after the processes of block 710 through 720 are performed for the PDUs deciphered from the process of block 706 over one or more HFNs from the scan of block 804, the process would proceed from to call C (i.e., 810), which resumes in FIG. 8.

Flow would then proceed to decision block 812 to determine if the rerunning of the detection method 700 using the deciphered PDUs returns a Count-C mismatch or not. It is noted that the process of 812 may include the same determination as discussed previously with respect to blocks 722 and 724 (or may instead be effected with the process of blocks 722, 724 in method 700 with the exception of not reverting to block 702 in the case of a negative condition in block 722). If a Count-C mismatch is still found using the values from the HFN scan of block 804, then flow proceeds to block 814 wherein notification is made in the receiver to the upper layers (e.g., RRC and above) that recovery of the PDUs has failed.

If the Count-C mismatch is not found in block 812, then the particular HFN resulting in this positive result is set as the HFN for Count-C values over the buffered PDUs and the buffered PDUs are then decoded and passed on to the higher layers. Afterward, flow proceeds to 818 where normal receiver deciphering and decoding operations are resumed.

It is noted that the methods disclosed herein (500, 700, 800) are operable in RLC AM and RLC UM modes of operation. Although not illustrated in FIG. 7 or 8, it is noted that in an aspect for RLC AM modes of operation, after attempting recovery with method 800, for example, if a receiver attempting recovery from a ciphering parameter mismatch fails to recover, the RLC RESET procedures specified in 3GPP TS25.322 (RLC), Rel-7 could be initiated. Additionally, in an aspect related to RLC UM modes of operation, if recovery utilizing method 800 fails to recover the PDUs, in such case the RRC Connection could be released.

Figure 9:
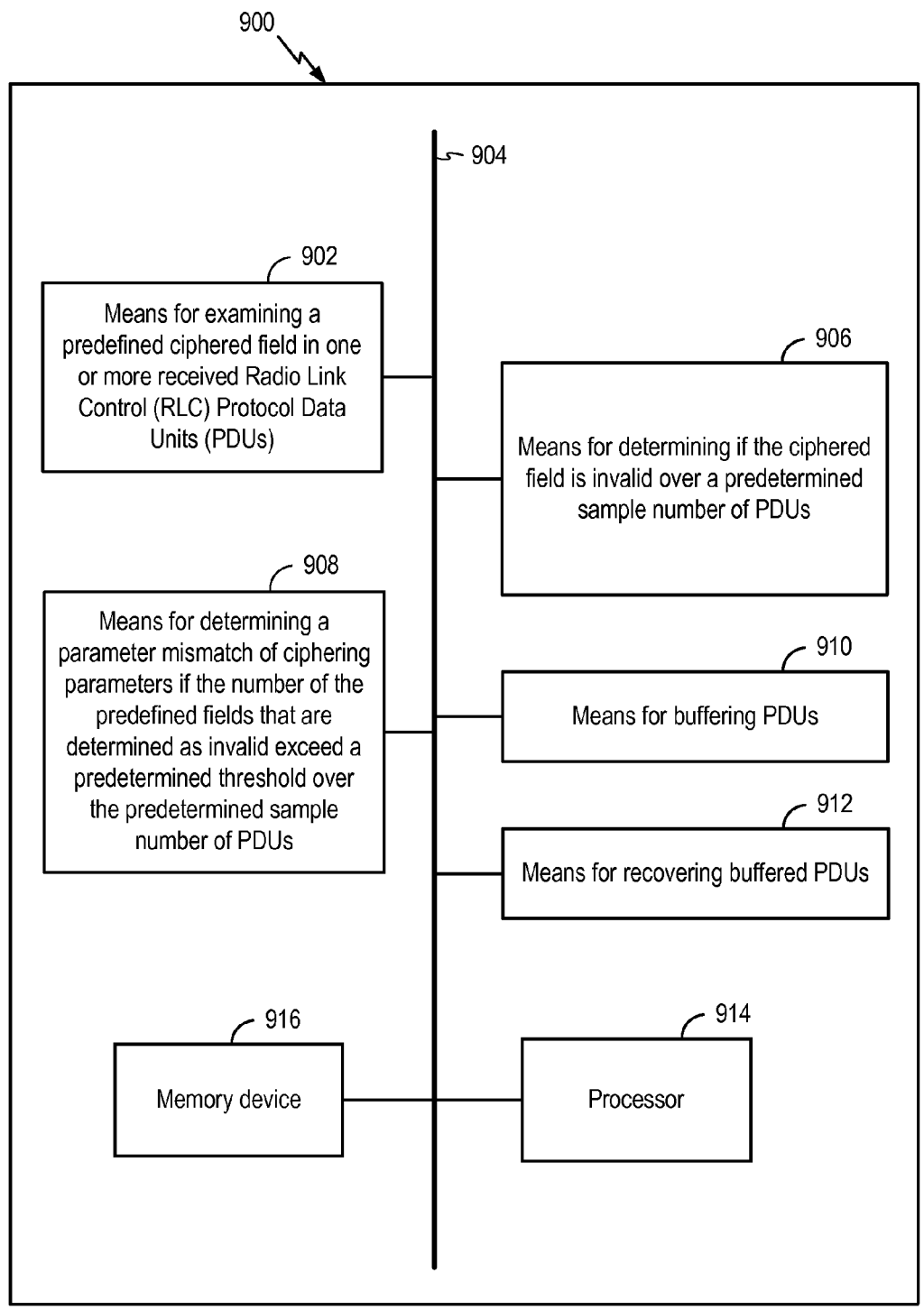
FIG. 9 illustrates a device or apparatus operable for employing the presently disclosed methods for detecting parameter mismatch in a receiver.

FIG. 9 illustrates a device or apparatus 900 operable for employing the presently disclosed methods for detecting parameter mismatch in a receiver. Apparatus 900 is operable within a receiver portion of a UE or other wireless device, or receiver portion of a network device, such as a NodeB or RNC. As illustrated, the apparatus 900 may include a means or module 902 for examining a predefined ciphered field in one or more received Radio Link Control (RLC) Protocol Data Units (PDUs). In an aspect, means 902 may be implemented with a deciphering unit within a receiver, such as deciphering block 616 in FIG. 6 as one illustration, or any other equivalent device or structure for carrying out the examination function. Additionally, it is noted that means 902 is configured to implement the process in block 502 or processes included in blocks 706 and 714, for example. Apparatus 900 includes a communication bus 904 as illustrated in the example of FIG. 9 merely to indicate that blocks, modules, or circuitry within apparatus 900 are communicatively coupled to afford communication of data and information there between.

Apparatus 900 further includes a means or module 906 for determining if the ciphered field is invalid over a predetermined sample number of PDUs. In an aspect, means 906 may be also effected by a deciphering unit within a receiver, such as deciphering block 616 in FIG. 6 as one illustration, or any other equivalent device or structure for carrying out the examination function. Additionally, it is noted that means 906 is configured to implement the processes in blocks 504 and 506 of FIG. 5 or processes included in blocks 706 and 718, for example.

Additionally, apparatus 900 includes a means or module 908 for determining a parameter mismatch of ciphering parameters if the number of the predefined fields that are determined as invalid exceed a predetermined threshold over the predetermined sample number of PDUs. Means 908 may implement the processes of block 508 in method 500 or blocks 722 and 724 in method 700, as two examples. additionally, means 908 may be implemented by the a deciphering block such as 616 as well as some additional functional unit, such as functional unit 626 illustrated in FIG. 6, or any other suitable equivalent means for effecting this functionality.

Apparatus 900 may also include a means for buffering 910 PDUs, such as for buffering PDUs detected as having an invalid LI fields and associated PDUs carrying the same SDU or sequence of SDUs. Means 910 may be implemented by reception buffer 620 in FIG. 6, a dedicated buffer (not shown), a combination thereof, or any other suitable means equivalent for carrying out the function of storing PDUs with invalid LI fields.

In an aspect, apparatus 900 may include a means for recovery 912, which is configured to implement the PDU recovery processes performed by method 800, for example. In an aspect, means 912 could be implemented in part by functional unit 628 shown in FIG. 6, as any suitable means equivalent for carrying out the function of recovering PDUs by scanning HFNs to determine possible HFNs for recovery and checking to determine by operation of the functions of the other means (i.e., 902, 906, and 908) on the HFNs a verification of a proper Count-C value to decipher buffered PDUs buffered by means 910.

Apparatus 900 also includes a general processor 914 (or application specific processor in another aspect), which may perform any or all of the various functions of the various means in association with a memory device 916 used to store instructions executable by the processor 914 to implement one or more various functions. Additionally, count values, such as LI_PDU and Invalid_LI as used in method 700 may be managed by such a processor, as well as accessing or determining HFN values, scanning a window of HFNs, Count-C values, etc., as utilized in methods 700 and 800.

It is noted that any of the means in apparatus 900 may be implemented with hardware, software, firmware, or any combination thereof, and may further be implemented separately as shown, or alternatively in an integral unit such as in processor 914.

Figure 10:
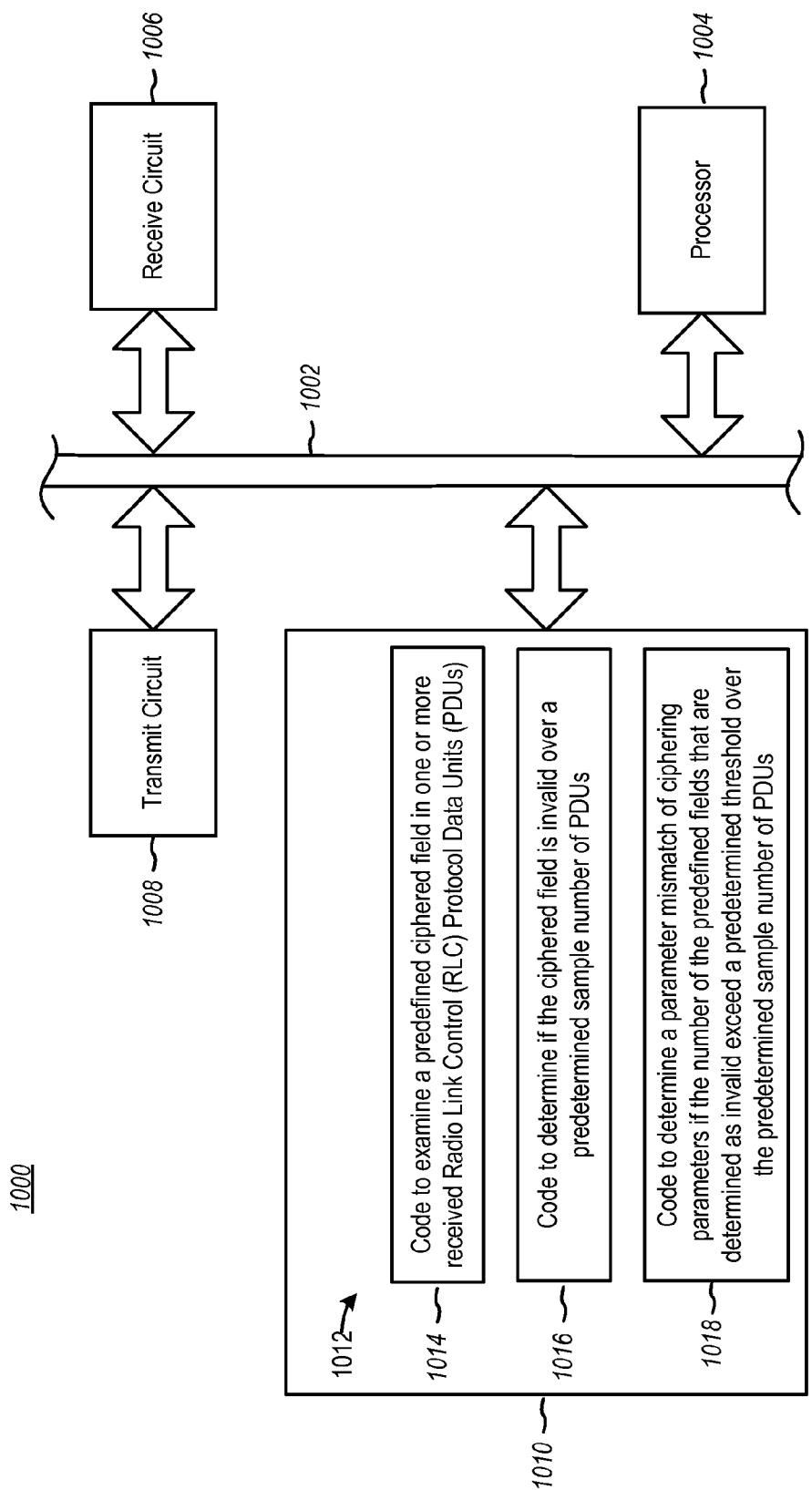
FIG. 10 illustrates a hardware implementation of an apparatus configured to employ the presently disclosed methods for detecting parameter mismatch in a receiver.

FIG. 10 shows part of a hardware implementation of an apparatus 1000 that is configured to employ the presently disclosed methods for detecting parameter mismatch in a receiver. The circuit apparatus is signified by the reference numeral 1000, which includes circuitry and may be one configuration of a transceiver in either a UE or network. In this application, it should be clear that the terms "circuit" and "circuitry" are to be construed as structural terms and not as functional terms. For example, circuitry can be an aggregate of circuit components, such as a multiplicity of integrated circuit components, in the form of processing and/or memory cells, units, blocks and the like, such as shown and described in FIG. 10.

The apparatus 1000 comprises a central data bus 1002 linking several circuits together. The circuits include a processor 1004, a receive circuit 1006, a transmit circuit 1008, and a memory 1010. The memory 1010 is in electronic communication with the processor 1004, i.e., the processor 1004 can read information from and/or write information to the memory 1010.

The processor 1004 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. The processor 1004 may include a combination of processing devices, e.g., a combination of a DSP and a microprocessor, a plurality of microprocessors, one or more microprocessors in conjunction with a DSP core, or any other such configuration.

The receive circuit 1006 and the transmit circuit 1008 can be connected to or part of an RF (Radio Frequency) circuit, which is not explicitly delineated in FIG. 10. The receive circuit 1006 may process and buffer received signals before sending the signals out to the data bus 1002. Additionally, the transmit circuit 1008 may process and buffer the data from the data bus 1002 before sending the data out of the device 1000. The processor 1004 may perform the function of data management of the data bus 1002 and further the function of general data processing, including executing the instructional contents of the memory 1010. Instead of separately disposed as shown in FIG. 10, as an alternative, the transmit circuit 1008 and the receive circuit 1006 may be part of the processor 1004.

The memory 1010 includes a set of instructions generally signified by the reference numeral 1012. The instructions 1012 may be executable by the processor 1004 to implement the methods described herein, such as the methods of FIGS. 5, 7 and 8, for example. The instructions 1012 may include code 1014 for examining a predefined ciphered field in one or more received Radio Link Control (RLC) Protocol Data Units (PDUs). The instructions 1012 may also include code 1016 to determine if the ciphered field is invalid over a predetermined sample number of PDUs. Additionally, instruction 1012 further includes code 1018 to determine a parameter mismatch of ciphering parameters if the number of the predefined fields that are determined as invalid exceed a predetermined threshold over the predetermined sample number of PDUs.

The instructions 1012 shown in the memory 1010 may comprise any type of computer-readable statement(s). For example, the instructions 1012 in the memory 1010 may refer to one or more programs, routines, sub-routines, modules, functions, procedures, data sets, etc. The instructions 1012 may comprise a single computer-readable statement or multiple computer-readable statements.

The memory 1010 may be a RAM (Random Access Memory) circuit. The memory 1010 can be tied to another memory circuit (not shown) which can either be of the volatile or nonvolatile type. As an alternative, the memory 1010 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. The memory 1010 may be considered to be an example of a computer-program product that comprises a computer-readable medium with instructions 1012 stored therein.

Those skilled in art will appreciate that the disclosed apparatus and methods for detection of mismatch of ciphering parameters and recovery therefrom are applicable for both RLC AM and RLC UM modes of operation. Furthermore, the present apparatus and methods for recovery provide a recovery solution for RLC UM mode, for which no known prior solution existed for recovery from parameter mismatch. Additionally, the recovery apparatus and method provide a lossless solution in that no data will be lost when recovery can be effected.

Still further, the present apparatus and methods provide a substantial reduction in the latency for detection and recovery relative to other known alternative solutions that are both lossy (i.e., presenting loss of data) and might not be suitable for RLC UM mode of operation, the case of recovery. Moreover, the disclosed apparatus and method are equally well suited for implementation on both the Network (e.g., NodeB or RNC) and in User-Equipment (UE), hence providing a complete end-to-end solution. Still further, although the present apparatus and methods have been described in the context and terminology of WCDMA/UMTS, it is noted that the concepts disclosed herein are applicable to other technologies and standards.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed examples is provided to enable any person skilled in the art to make or use the presently disclosed methods and apparatus. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for determining mismatch of ciphering parameters in a wireless device, the method comprising:
   examining a predefined ciphered field in one or more received Radio Link Control (RLC) layers in Protocol Data Units (PDUs) including examining if data in the predefined ciphered field of the PDU points to invalid positions lying beyond an end of the PDU to determine if the field is invalid;
   determining when the predefined ciphered field is invalid over a predetermined sample number of PDUs;
   determining a parameter mismatch of ciphering parameters when a predetermined number of samples of the predefined ciphered field that are determined as invalid exceed a predetermined threshold;
   buffering the one or more received RLC PDUs whenever the field is determined to be invalid during sampling over the predetermined sample number of PDUs; and
   recovering the buffered one or more PDUs after determining mismatch of the ciphering parameter, wherein recovering the buffered one or more PDUs further comprises scanning Hyper-Frame numbers (HFNs)

over a window of HFNs for the buffered one or more received PDUs when the parameter mismatch is determined.

2. The method as defined in claim 1, wherein the predefined field is a length indicator (LI) field that is subject to ciphering by the RLC layer.

3. A method for determining mismatch of ciphering parameter in a wireless device employing a Counter Check procedure, comprising:
examining a predefined ciphered field in one or more received Radio Link Control (RLC) layers in Protocol Data units (PDUs) including examining if data in the predefined ciphered field of the PDU points to invalid positions lying beyond an end of the PDU to determine if the field is invalid;
determining when the predefined ciphered field is invalid over a predetermined sample number of PDUs;
determining a parameter mismatch of ciphering parameters when a predetermined number of samples of the predefined ciphered field that are determined as invalid exceed a predetermined threshold;
buffering the one or more received RLC PDUs whenever the field is determined to be invalid during sampling over the predetermined sample number of PDUs; and
recovering the buffered one or more RLC PDUs after determining mismatch of the ciphering parameter, wherein recovering the buffered one or more RLC PDUs further comprises scanning Hyper-Frame numbers (HFNs) over a window of HFNs for the buffered one or more received RLC PDUs when the parameter mismatch is determined;
wherein the ciphering parameter includes a Count-C value.

4. The method as defined in claim 1, wherein the buffered one or more received RLC PDUs include one or more PDUs carrying one or more associated Service Data units (SDUs).

5. The method as defined in claim 1, wherein recovering the buffered one or more PDUs further comprises:
deciphering the PDUs using one or more of the scanned HFNs;
determining whether parameter mismatch of ciphering parameters exists based on the deciphered PDUs using one or more of the scanned HFN s; and
setting a current HFN value to at least one HFN when that HFN yields no parameter mismatch for decoding the buffered one or more received PDUs.

6. The method as defined in claim 5, wherein the ciphering parameter includes a Count-C value comprising the at least one HFN.

7. The method as defined in claim 1, wherein the method is operable in a receiver in one or more of a UE, NodeB, or network device.

8. An apparatus for determining mismatch of ciphering parameters in a wireless device, the apparatus comprising:
means for examining a predefined ciphered field in one or more received Radio Link Control (RLC) layers in Protocol Data Units (PDUs) including examining if data in the predefined ciphered field of the PDU points to invalid positions lying beyond an end of the PDU to determine if the field is invalid;
means for determining when the predefined ciphered field is invalid over a predetermined sample number of PDUs;
means for determining a parameter mismatch of ciphering parameters when a predetermined number of samples of the predefined ciphered field that are determined as invalid exceed a predetermined threshold;
means for buffering the one or more received RLC PDUs whenever the field is determined to be invalid during sampling over the predetermined sample number of PDUs;
means for recovering the buffered one or more PDUs after determining mismatch of the ciphering parameter; and
means for recovering the buffered one or more PDUs after determining mismatch of the ciphering parameter, wherein the means for recovering the buffered one or more PDUs further comprises means for scanning Hyper-Frame numbers (HFNs) over a window of HFNs for the buffered one or more received PDUs when the parameter mismatch is determined.

9. The apparatus as defined in claim 8, wherein the predefined field is a length indicator (LI) field that is subject to ciphering by the RLC layer.

10. An apparatus for determining mismatch of a wireless device employing a Counter Check Procedure, comprising;
means for examining a predefined ciphered field in one or more received Radio Link Control (RLC)) Protocol Data Unit (PDUs) including examining if data in the predefined ciphered field of the PDU points to invalid positions lying beyond an end of the PDU to determine if the field is invalid;
means for determining when the predefined ciphered field is invalid over a predetermined sample number of PDUs;
means for determining a parameter mismatch of ciphering parameters when a predetermined number of samples of the predefined ciphered field that are determined as invalid exceed a predetermined threshold;
means for buffering the one or more received RLC PDUs whenever the field is determined to be invalid during sampling over the predetermined sample number of PDUs; and
means for recovering the buffered one or more PDUs after determining mismatch of the ciphering parameter, wherein the means for recovering the buffered one or more PDUs further comprises means for scanning Hyper-Frame numbers (HFNs) over a window of HFNs for the buffered one or more received PDUs when the parameter mismatch is determined;
wherein the ciphering parameter includes a Count-C value.

11. The apparatus as defined in claim 8, wherein the buffered one or more received RLC PDUs include one or more PDUs carrying one or more associated Service Data units (SDUs).

12. The apparatus as defined in claim 8, wherein the means for recovering the buffered one or more PDUs further comprises:
means for deciphering the PDUs using one or more of the scanned HFNs;
means for determining whether parameter mismatch of ciphering parameters exists based on the deciphered PDUs using one or more of the scanned HFNs; and
means for setting a current HFN value to at least one HFN when that HFN yields no parameter mismatch for decoding the buffered one or more received PDUs.

13. The apparatus as defined in claim 12, wherein the ciphering parameter includes a Count-C value comprising the at least one HFN.

14. The apparatus as defined in claim 8, wherein the apparatus is operable in a receiver in one or more of a UE, NodeB, or network device.

15. An apparatus for determining mismatch of ciphering parameters in a wireless device that results in an RLC Reset procedure for the RLC Unacknowledged Mode (UM) of operations, the apparatus comprising at least one processor configured to:

examine a predefined ciphered field in one or more received Radio Link Control (RLC) layers in Protocol Data Units (PDUs) including examining if data in the predefined ciphered field of the PDU points to invalid positions lying beyond an end of the PDU to determine if the field is invalid;

determine when the predefined ciphered field is invalid over a predetermined sample number of PDUs;

determine a parameter mismatch of ciphering parameters when a predetermined number or percentage of samples of the predefined ciphered field that are determined as invalid exceed a predetermined threshold;

buffer the one or more received RLC PDUs whenever the field is determined to be invalid during sampling over the predetermined sample number of PDUs; and recover the buffered one or more PDUs after determining mismatch of the ciphering parameter, wherein the least one processor as configured to recover the buffered one or more PDUs is further configured to scan Hyper-Frame numbers (HFNs) over a window of HFNs for the buffered one or more received PDUs when the parameter mismatch is determined.

16. The apparatus as defined in claim 15, wherein the predefined field is a length indicator (LI) field that is subject to ciphering by the RLC layer.

17. An apparatus for determining mismatch of ciphering parameters in a wireless device that results in an RLC Reset procedure for the RLC Unacknowledged Mode (UM) of operations, the apparatus comprising at least one processor configured to:

examine predefined ciphered field in one or more received Radio Link Control (RLC) layers in Protocol Data units (PDUs) including examining if data in the predefined ciphered field of the PDU points to invalid positions lying beyond an end of the PDU to determine if the field is invalid;

determine when the predefined ciphered field is invalid over a predetermined sample number of PDUs;

determine a parameter mismatch of ciphering parameters when a predetermined number or percentage of samples of the predefined ciphered field that are determined as invalid exceed a predetermined threshold; and buffer the one or more received RLC PDUs whenever the field is determined to be invalid during sampling over the predetermined sample number of PDUs; and recover the buffered one or more PDUs after determining mismatch of the ciphering parameter, wherein the least one processor as configured to recover the buffered one or more PDUs is further configured to scan Hyper-Frame numbers (HFNs) over a window of HFNs for the buffered one or more received PDUs when the parameter mismatch is determined;

wherein the ciphering parameter includes a Count-C value.

18. The apparatus as defined in claim 15, wherein the buffered one or more received RLC PDUs include one or more PDUs carrying one or more associated Service Data units (SDUs).

19. The apparatus as defined in claim 15, wherein the least one processor as configured to recover the buffered one or more PDUs is further configured to:

decipher the PDUs using one or more of the scanned HFNs;

determine whether parameter mismatch of ciphering parameters exists based on the deciphered PDUs using one or more of the scanned HFNs; and set a current HFN value to at least one HFN when that HFN yields no parameter mismatch for decoding the buffered one or more received PDUs.

20. The apparatus as defined in claim 19, wherein the ciphering parameter includes a Count-C value comprising the at least one HFN.

21. The apparatus as defined in claim 15, wherein the apparatus is operable in a receiver in one or more of a UE, NodeB, or network device.

22. A non-transitory computer-readable medium having stored thereon:

code for causing a computer to examine a predefined ciphered field in one or more received Radio Link Control (RLC) layers in Protocol Data Units (PDUs) in order to determine mismatch of ciphering parameters in a communication device including examining if data in the predefined ciphered field of the PDU points to invalid positions lying beyond an end of the PDU to determine if the field is invalid;

code for causing a computer to determine when the predefined ciphered field is invalid over a predetermined sample number of PDUs;

code for causing a computer to determine a parameter mismatch of ciphering parameters when a predetermined number of samples of the predefined ciphered field that are determined as invalid exceed a predetermined threshold;

code for causing a computer to buffer the one or more received RLC PDUs whenever the field is determined to be invalid during sampling over the predetermined sample number of PDUs; and code for causing a computer to recover the buffered one or more PDUs after determining mismatch of the ciphering parameter, wherein the code for causing a computer to recover the buffered one or more PDUs further comprises code for causing a computer to scanning Hyper-Frame numbers (HFNs) over a window of HFNs for the buffered one or more received PDUs when the parameter mismatch is determined.

23. The non-transitory computer readable medium as defined in claim 22, wherein the predefined ciphered field is a length indicator (LI) field that is subject to ciphering by the RLC layer.

24. A non-transitory computer readable medium having stored thereon:

code for causing a computer to examine a predefined ciphered field in one or more received Radio Link Control (RLC) layers in Protocol Data Units (PDUs) in order to determine mismatch of ciphering parameters in a communication device including examining if data in the predefined ciphered field of the PDU points to invalid positions lying beyond an end of the PDU to determine if the field is invalid;

code for causing a computer to determine when the predefined ciphered field is invalid over a predetermined sample number of PDUs;

code for causing a computer to determine a parameter mismatch of ciphering parameters when a predetermined number of samples of the predefined ciphered field that are determined as invalid exceed a predetermined threshold;

code for causing a computer to buffer the one or more received RLC PDUs whenever the field is determined to be invalid during sampling over the predetermined sample number of PDUs; and code for causing a computer to recover the buffered one or more PDUs after determining mismatch of the ciphering parameter, wherein the code for causing a computer to recover the buffered one or more PDUs further comprises code for causing a computer to scanning Hyper-Frame numbers (HFNs) over a window of HFNs for the buffered one or more received PDUs when the parameter mismatch is determined;

wherein the ciphering parameter includes a Count-C value.

25. The non-transitory computer readable medium as defined in claim 22, wherein the buffered one or more received RLC PDUs include one or more PDUs carrying one or more associated Service Data units (SDUs).

26. The non-transitory computer readable medium as defined in claim 22, wherein the code for causing a computer to recover the buffered one or more PDUs further comprises:

code for causing a computer to decipher the PDUs using one or more of the scanned HFNs;

code for causing a computer to determine whether parameter mismatch of ciphering parameters exists based on the deciphered PDUs using one or more of the scanned HFNs; and code for causing a computer to set a current HFN value to at least one HFN when that HFN yields no parameter mismatch for decoding the buffered one or more received PDUs.

27. The non-transitory computer readable medium as defined in claim 26, wherein the ciphering parameter includes a Count-C value comprising the at least one HFN.

28. The non-transitory computer readable medium as defined in claim 22, wherein the communication device includes a receiver in one or more of a UE, NodeB, or network device.

* * * * *